T. Reeves,
Lubricator.

No. 112,847. Patented Mar. 21, 1871.

Witnesses:
Chas. Nida
Wm. H. C. Smith

Inventor:
T. Reeves.
per Munn & Co.
Attorneys.

UNITED STATES PATENT OFFICE.

TAPPING REEVES, OF LITTLE RIVER, CALIFORNIA.

IMPROVEMENT IN LUBRICATORS.

Specification forming part of Letters Patent No. 112,847, dated March 21, 1871.

*To all whom it may concern:*

Be it known that I, TAPPING REEVES, of Little River, in the county of Mendocino and State of California, have invented a new and useful Improvement in Lubricator for Steam-Cylinders; and I do hereby declare that the following is a full, clear, and exact description thereof, which will enable others skilled in the art to make and use the same, reference being had to the accompanying drawing, forming part of this specification, in which—

Figure 1:
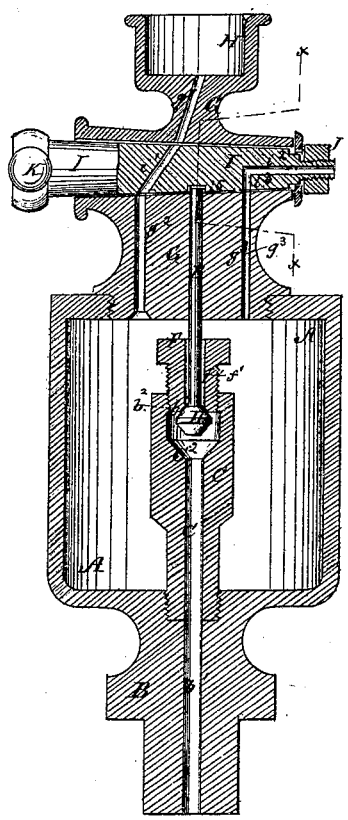
Figure 2:
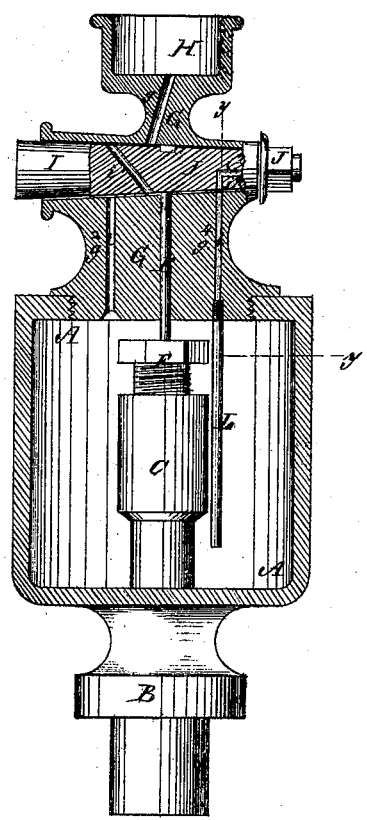
Figures 3, 4:
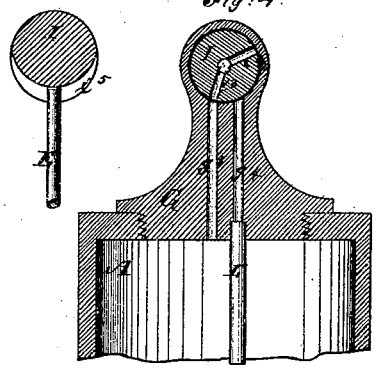

Figure 1 is a detail sectional view of my improved lubricator adjusted for filling. Fig. 2 is a detail sectional view of the same adjusted for blowing off the water. Fig. 3 is a detail cross-section of the plug, taken through the line $x\,x$, Fig. 1. Fig. 4 is a detail sectional view of the same, taken through the line $y\,y$, Fig. 2.

Similar letters of reference indicate corresponding parts.

My invention has for its object to furnish an improved lubricator for steam-cylinders, which shall be so constructed that it may be supplied with oil when the cylinder is under steam-pressure, and which will enable the water of condensation to be readily blown off when it is necessary to replenish the reservoir with oil; and it consists in the construction and combination of the various parts of the lubricator, as hereinafter more fully described.

A is the oil-reservoir, the lower end or stem B of which is designed to be screwed into the cylinder to be oiled. Through the center of the stem B is formed a hole, $b'$, for the passage of the oil to the cylinder.

Into the bottom of the reservoir A is screwed the lower end of a tube, C, which passes up nearly to the top of the reservoir A, and which has a perforation, $c^1$, formed through it longitudinally, which perforation forms a continuation of the passage $b'$.

The upper end of the perforation $c^1$ is enlarged to form a valve-seat, $c^2$, for the valve D, the stem E of which passes up through a hole, $f^1$, in the cap F, which is screwed into the cavity in the upper end of the tube C, and which has a valve-seat, $f^2$, formed in its lower end for the valve D, a sufficient space being left between the seats $c^2$ and $f^2$ to allow the valve to play.

The top of the cap F reaches almost to the top of the reservoir, and the hole through it is made larger than the stem E, so that the oil may flow through said hole around the said stem to enter the cylinder.

G is the cap, which is screwed into the upper end of the reservoir A, and in the upper end of which is formed a cavity or cup, H, to serve as a funnel in pouring in the oil, and through the body of which is formed a transverse tapering hole to receive the tapering plug I, which is kept in place by the nut J screwed upon its tapering end, and has a handle, K, formed upon its larger end for convenience in operating it.

From the bottom of the cup H a perforation, $g^1$, leads down to the plug I, and from the plug I a perforation, $g^2$, leads down to the reservoir A.

The perforations $g^1$ and $g^2$ are so arranged that their ends in contact with the plug I may not be opposite to each other, as shown in Figs. 1 and 2.

$i^1$ is a perforation leading through the plug I in an inclined direction, so that when the plug I is so turned as to bring the handle K into a horizontal position, as shown in Fig. 1, the ends of the perforation $i^1$ may correspond with the ends of the perforations $g^1\,g^2$, to form a continuous passage from the cup H to the reservoir A for the oil to flow through in filling the said reservoir A with oil. When the plug I is turned into any other position the ends of the perforation $i$ will not correspond with the ends of the perforations $g^1 g^2$, securely closing the passage, so that nothing can pass into or out of the said reservoir. $g^3$ is a perforation leading from the reservoir A to the plug I, near its smaller end. $i^2$ is a perforation leading in through the smaller end of the said plug I. $i^3$ is a perforation leading from the perforation $i^2$ to the side of the plug I, in such a position that when the plug I is adjusted to open the passage $g^1\,i^1\,g^2$ the end of the perforation $i^3$ may correspond with the end of the perforation $g^3$, opening a passage, $g^3\,i^3\,i^2$, through which the air or steam may escape from the reservoir A as the oil flows in. The passage $g^3\,i^3\,i^2$ is closed by shifting the position of the plug I. $i^4$ is a perforation leading from the passage $i^2$ out through the side of the plug I, so that when the plug I is turned so that the handle K may be in the opposite position from that shown in Fig. 1 the end of the passage $i^4$ may correspond with the end of a perforation, $g^4$, leading down into the reservoir A. L is a tube, the upper end of which is screwed into the lower end of the perforation $g^4$, and the lower end of which extends nearly to the bottom of the reservoir A, as shown in Fig. 2.

In the lower side of the middle part of the plug I, when said plug is turned into the position shown in Fig. 1, is formed a notch or cam-groove, $i^5$, so that when the plug I is adjusted for filling the reservoir with oil the upper end of the valve-stem E may enter the said notch or groove, allowing the piston D to be forced up by the steam-pressure into the seat $f^2$, entirely preventing the escape of steam into the reservoir A to interfere with the operation of supplying said reservoir with oil.

When the plug I is turned into the position shown in Fig. 2, the passage $i^2$ $i^4$ $g^1$ is opened and the valve D is forced down from its seat $f^2$ against the steam-pressure, allowing the steam to enter the reservoir A and force the water of condensation out through the passage $i^2$ $i^4$ $g^4$. By this construction, when the steam is exhausted from the cylinder the valve D will drop down by its own weight into the seat $c^2$, stopping the entrance of oil into the cylinder.

When the steam is in the cylinder the valve D is raised by steam-pressure until the end of the stem E strikes against the plug I, which prevents the valve D from reaching the seat $f^2$, so that the oil can flow past the said valve D and enter the cylinder, the oil thus always entering the cylinder against the steam-pressure.

Having thus described my invention, I claim as new and desire to secure by Letters Patent—

1. The valve D, two valve-seats, $c^2$ $f^2$, valve-stem E, and notch $i^5$, in combination with the tube C, cap F, reservoir A, and plug I, substantially as herein shown and described, and for the purpose set forth.

2. The combination of the tube L and passage $g^4$ $i^4$ $i^2$ with the reservoir A, top piece G, plug I, tube C, valve D, and stem E, substantially as herein shown and described, and for the purpose set forth.

3. An improved lubricator consisting of the reservoir A, stem B, tube C, cap F, passage $b'$ $c^1$ $f^1$, valve-seats $c^2$ $f^2$, valve D, valve-stem E, top G, plug I, cup H, notch $i^5$, passage $g^1$ $i^1$ $g^2$, passage $g^3$ $i^3$ $i^2$, and passage $g^4$ $i^4$ $i^2$, said parts being constructed and operating substantially as herein shown and described, and for the purpose set forth.

The above specification of my invention signed by me this 30th day of January, 1871.

TAPPING REEVES.

Witnesses:
JAMES T. GRAHAM,
GEO. W. MABEE.